United States Patent [19]

Tine et al.

[11] 3,841,438
[45] Oct. 15, 1974

[54] INJECTION LUBRICATOR

[75] Inventors: Sebastian David Tine, Lawrence;
Albert W. Dewberry, Boxford, both of Mass.

[73] Assignee: Watts Regulator Company, Lawrence, Mass.

[22] Filed: Dec. 15, 1972

[21] Appl. No.: 315,496

[52] U.S. Cl. .............................. 184/7 D, 184/55 A
[51] Int. Cl. .......................... F01m 1/06, F16n 7/14
[58] Field of Search ........ 184/55 A, 55 R, 7 D, 7 E; 92/13.8, 13.51

[56] References Cited
UNITED STATES PATENTS

| | | | |
|---|---|---|---|
| 2,792,911 | 5/1957 | Harter | 184/7 E |
| 3,075,615 | 1/1963 | Thomas | 184/7 E |
| 3,581,845 | 6/1971 | VanNederynen | 184/7 D |
| 3,590,956 | 7/1971 | Obergefell | 184/7 E |
| 3,628,631 | 12/1971 | O'Leary | 184/55 A |
| 3,731,763 | 5/1973 | Thrasher | 184/7 D |

*Primary Examiner*—Manuel A. Antonakas
*Assistant Examiner*—Daniel J. O'Connor
*Attorney, Agent, or Firm*—Norman Lettvin

[57] ABSTRACT

An airline lubricator is disclosed for delivering on demand metered quantities of oil to a pneumatic tool through: (1) a conduit external of the air line; (2) a conduit internal thereof; (3) by injecting an atomized mist of oil into the air line. An indicator piston reciprocates in a transparent housing mounted to the lubricator with the flow of oil so that by observing the movement of the piston it can be determined if the lubricator is operating properly. A tamper-proof oil-metering adjusted is provided for adjusting the quantity of oil delivered by the lubricator and for preventing tampering or accidental readjustment.

12 Claims, 4 Drawing Figures

INJECTION LUBRICATOR

BACKGROUND OF THE INVENTION

This invention relates to air line lubricators which dispense metered quantities of lubricant to a pneumatically-operated tool or the like.

Lubricators, connected in an air line between a pneumatic tool and an air source, for dispensing metered quantities of lubricant to the pneumatic tool in response to increased air flow rates are known in the art. Depending upon the particular purpose, prior art injectors have been known to provide for delivery of lubricant in only one of the following three modes: by delivering the oil to the tool through a tube external to the air line; by delivering the oil through a tube running within the air line; or by delivering a "lubricant mist" in the air line which is carried to the tool. It would be desirable to have a lubricator having greater adaptability as to the mode of delivery of lubricant.

Therefore, it is an object of this invention to provide an inline lubricator which is convertible to provide different types of oil delivery.

In the event the lubricant is not being received by the tool, it may be difficult to determine if the lubricator is operating properly. It is therefore another object of this invention to provide means associated with said lubricator for indicating proper operation of the lubricator.

All lubricators include flow rate sensors which sense the air flow rate and the demand for lubricant. However, it has been found that the prior art lubricators may consume or leak air. Thus, yet another object is to provide a flow-through lubricator in which the sensing system is substantially leak-free.

Air line lubricators also include mechanisms for adjusting the quantity of oil delivered by the lubricator. However, these adjustors have been subject to tampering or accidental readjustment. It is therefore another object to provide an oil delivery adjustor which cannot be accidentally readjusted and which is substantially tamper-proof.

These and other objects will become apparent from the following description and appended claims.

SUMMARY OF THE INVENTION

There is provided by virtue of this invention a lubricator for mounting in an air line to dispense small metered quantities of oil to a pneumatic tool, which is readily converted to deliver the oil to the tool: (1) through a conduit external of the air line; (2) through a line internal of the air line; or (3) as a mist in the air line. An indicator piston, positioned in a transparent housing mounted to the lubricator, reciprocates with the pumping of oil and can be visually observed so as to determine the operational condition of the lubricator.

A novel air flow rate sensor which moves in response to changes in flow rates above an actuation rate is provided which is substantially leak-free. Also provided is a metering adjustment mechanism which includes a knob that is axially movable toward the lubricator to a first position to adjust the oil flow rate, and is movable away from the lubricator to a second non-adjusting position or can be removed from the lubricator, thereby rendering it substantially tamper-proof.

These and other objects will become apparent from the following description and appended claims.

DESCRIPTION OF THE PREFERRED EMBODIMENT

Figure 1:
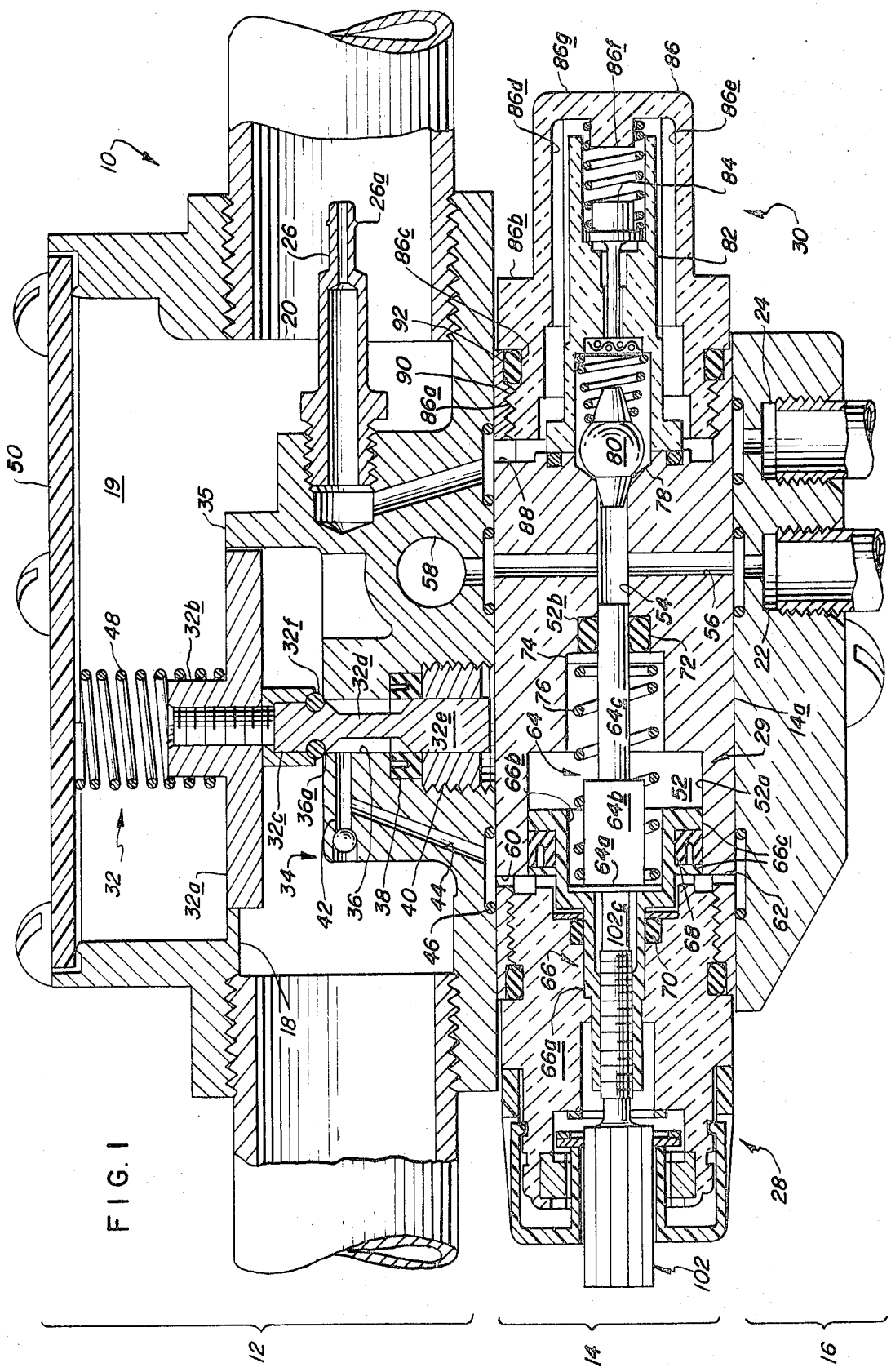
FIG. 1 is a longitudinal sectional view of the lubricator of this invention with the components being shown in their noflow position.

Referring now to the drawings, the lubricator 10 includes an upper body portion 12, middle body portion 14 and lower body portion 16. Incoming air entering the lubricator at an air inlet port 18 flows through a cavity 19 in the upper body and exits at the air outlet port 20. Oil enters the lubricator at the oil inlet port 22 in the lower body and can exit via an external port 24 or through an internal nozzle 26 at the air outlet port 20. An oil delivery adjuster assembly 28 is mounted to one end of the middle body and cooperates with an oil pump assembly 29 in the middle body. A pumping indicator assembly 30 is mounted to the other end of the middle body.

An air sensor assembly 32 is positioned in the cavity 19, and when activated by an increase in air flow rate above a predetermined actuation level, causes the pump assembly 29 to deliver a metered quantity of oil through the oil flow system of which the indicator assembly is part, to one of the oil exits 24 or 26. The adjustor assembly 28 permits adjustment of the stroke of the pump so as to vary the quantity of oil delivered.

Air Sensor Assembly

The air sensor assembly 32 includes a piston-and-valve-stem assembly which is positioned between the air inlet and outlet ports and against which all incoming air flows. The assembly includes a flat, circularly-shaped piston section 32a having an upstanding spring keeper and travel limiting post 32b on one side and carries on the other side a shaped valve stem which includes an upper O-ring carrying head 32c, a reduced shank section 32d and a lower head 32e.

The upper body includes a boss-like formation 34 which defines a sleeve-like section 35 for sliding and sealing cooperation with the piston 32a, and the formation 34 also defines a passageway 36 within which the valve stem moves. The upper end 36a of the passageway 36 provides a seat and port for the entry of air to the pump assembly 29 and is arranged for engagement and sealing by O-ring 32f. The lower end of passageway 36 is enlarged, and a lip-type seal 38 which sealingly cooperates with head 32e is positioned therein by the internally-bored plug 40. When the upper head 32c is seated, the lower head is positioned below the seal 38 but when the head 32c is unseated the lower head 32e engages the seal 38. The drilled holes 42 and 44 connect the passageway 36 to a sealed opening 46 which is arranged for communication with the pump assembly 29.

A coiled compression spring 48 engages the piston 32a, surrounds post 32b and engages the cover 50 so as to bias the piston assembly 32 toward a position where the enlarged head 32c is seated at port 36a. Incoming air exerts a force on the under side of piston 32a and when that force exceeds a predetermined value the piston moves upwardly against the spring 48 and the air passes into both the cavity 19 and the passageway 36. The upward movement of the piston is limited by engagement of the post 32b and the cover 50. When the force is reduced the piston returns to its lower seated position.

From this it is seen that the sensor assembly is substantially leak-free since when the piston is in the activated upper position the unit is pneumatically sealed by the engagement of the valve stem's lower head 32e and the lip-type seal 38. The pneumatic seal is maintained when the piston is in the unactivated lower position by the valve stem's upper head and the engagement of the O-ring 32f with the port 36a as well as engagement of the piston 32a with the body sleeve 35.

Oil Pump Assembly

The center section 14a of the middle body 14 includes a step-shaped cylinder or chamber 52 which terminates in an axially extending oil pumping passageway 54. The transverse oil supply hole 56 extends through the center section 14a, intersects the passageway 54 and connects the oil inlet 22 with a reservoir tap 58 in the upper body. The adjuster assembly 28 is threadably and sealingly received at the cylinder end of the section 14a and the indicator assembly 30 is threadably and sealingly received at the other end of the section 14a.

Air flowing to the pump assembly enters the section 14a through ports 60 or 62 and then flows against the air piston 66 which cooperates with the oil piston 64 to pump oil from the passageway 54 to one of the exits 24 or 26.

The air cylinder 66 is a hollow, elongated, step-shaped member having an internally-threaded end section 66a which opens to a hollow inner oil piston-receiving section 66b that is surrounded by the spaced peripheral flanges 66c which slideably engage the cylinder wall 52a. A V-shaped seal 68 is carried between the flanges and sealingly engages the wall 52a and an O-ring 70 sealingly engages the outer surface of the end section 66a so as to complete the air chamber seals.

The oil piston 64 has an enlarged head 64a which is axially movable within the piston-receiving section 66b, a reduced center section 64b which acts as a spring keeper, and an elongated end section 64c which slides within the bore 54 for pumping oil. An oilsealing O-ring 72 in the small end 52b of the cylinder 52 engages the end section 64c for preventing oil leakage into the air cylinder. A retainer washer 74 holds the O-ring 72 in place and acts as a seat for the coiled compression spring 76 which surrounds the piston keeper section 64b, engages the enlarged head 64a, holds the oil piston against the air piston and biases both pistons toward the adjuster 28.

Figure 2:
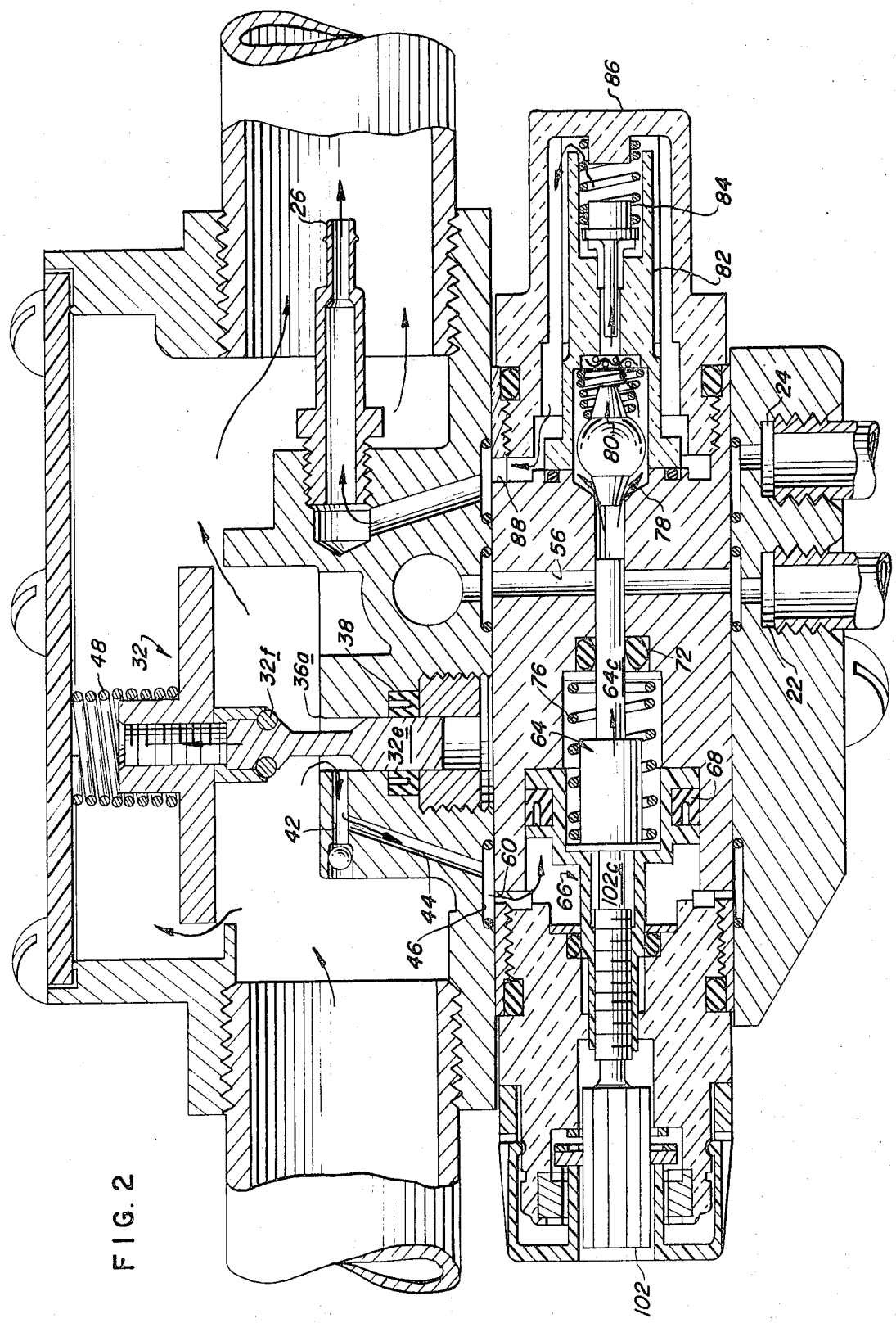
FIG. 2 is a sectional view similar to FIG. 1 with the components being shown in the flow position.
Figure 3:
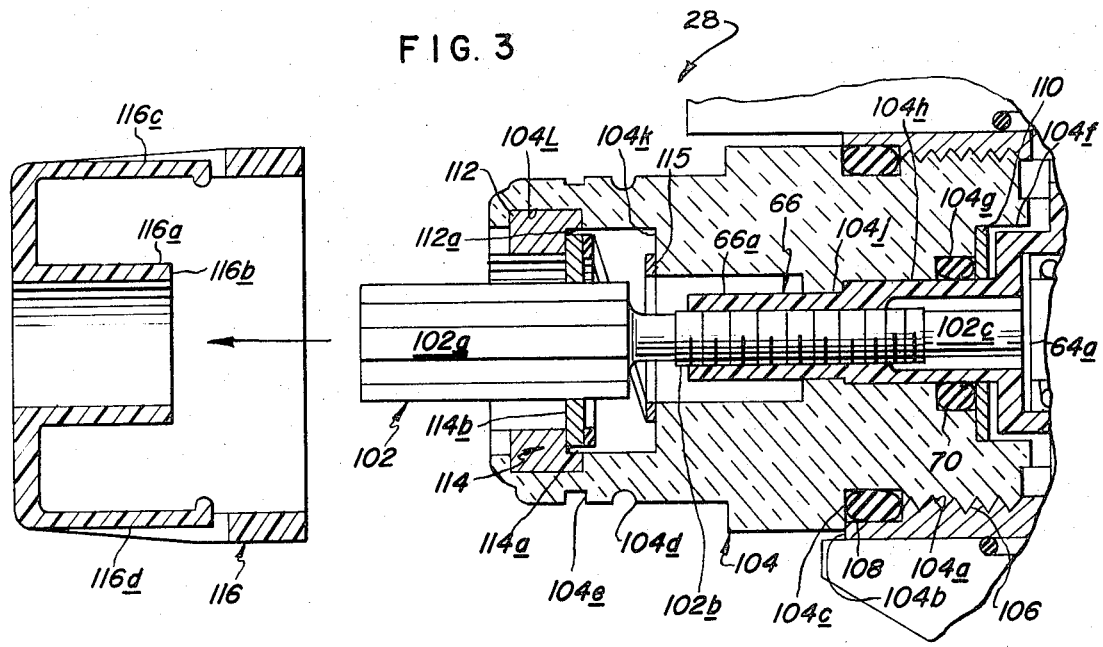
FIG. 3 is a greatly enlarged, fragmentary, longitudinal sectional view of the adjustment mechanism with the control knob removed therefrom.

Air entering the port 60 urges the air piston 66 and oil piston 64 against the spring 76 and causes the piston end 64c to extend into the oil passageway 54. As the end 64c moves toward the indicator end of the passageway 54 it pumps the oil therein out of the passageway. When the rod end passes the supply hole 56 it closes off the oil supply and injects a "slug" of oil into the indicator assembly 30, as seen in FIG. 2.

When the air pressure is reduced the biasing spring urges the pistons back to their normal position with the rod end 64c retracted upstream of the supply hole 56 and the piston 66 abutting the adjuster assembly 28.

Flow Indicator Assembly

Oil enters the indicator assembly 30 at seat 78 which is controlled by a check valve 80 that is mounted within an optically-clear sleeve 82, flows through the sleeve, past an indicator piston 84, out of the sleeve and into flow passages provided between the sleeve and an external optically-clear, elongated cap 86 and through an exit port 88 in the internally-threaded section 90 to the oil exit. The cap 86 has an externally-threaded end 86a for cooperation with the internally-threaded section 90 and an external knurled shoulder formation 86b which is arranged to abut the end of the threaded section 90 and which facilitates loosening, tightening and positioning of the cap. An O-ring 92 is positioned in a retaining groove 86c between the threads 86a and shoulder formation 86b for sealing the interior of the cap and preventing leakage therefrom. Internally, the cap includes opposed flow grooves 86d and 86e and an axially-projecting keeper post 86f on the transverse end wall 86g.

The inner sleeve 82 is axially elongated and telescopically fits within the cap 86. One end 82a is of reduced diameter so as to maintain a spaced relation between the sleeve and grooves 86d and 86e to permit flow therebetween. The intermediate section 82b fits snugly against the cap bore 86h so as to radially position the sleeve 82 within the cap 86. The end section 82c has a flat face 82d which abuts the middle section 14a and the O-ring 94 to assure sealed oil flow into the sleeve 82.

The sleeve 82 is provided with a check valve chamber 82e which has an upstream shoulder 82f against which the conical compression spring 96 seats so as to bias the check valve 80 in an upstream direction against the seat 78 for closing flow into passageway 54. A debris-collecting filter screen 98 is mounted across the flow path at the downstream end of the check valve chamber. An indicator piston chamber in which the piston 84 is movable, is provided downstream of the screen. The chamber includes an elongated passageway 82g which opens to a shoulder 82h and an open-ended section 82j.

The piston 84 includes an elongated stem 84a which slides within the passageway 82g, a disc-like section 84b arranged for engagement with the shoulder 82h and a post-like end section 84c. The compression spring 100 is positioned around the post 86f, against the transverse wall 86g, around the piston post 84c and against the disc section 84b so as to bias the piston against the shoulder 82h. Oil flowing into the chamber causes the piston to move axially toward the end wall against the spring 100 so as to indicate flow.

Figure 4:
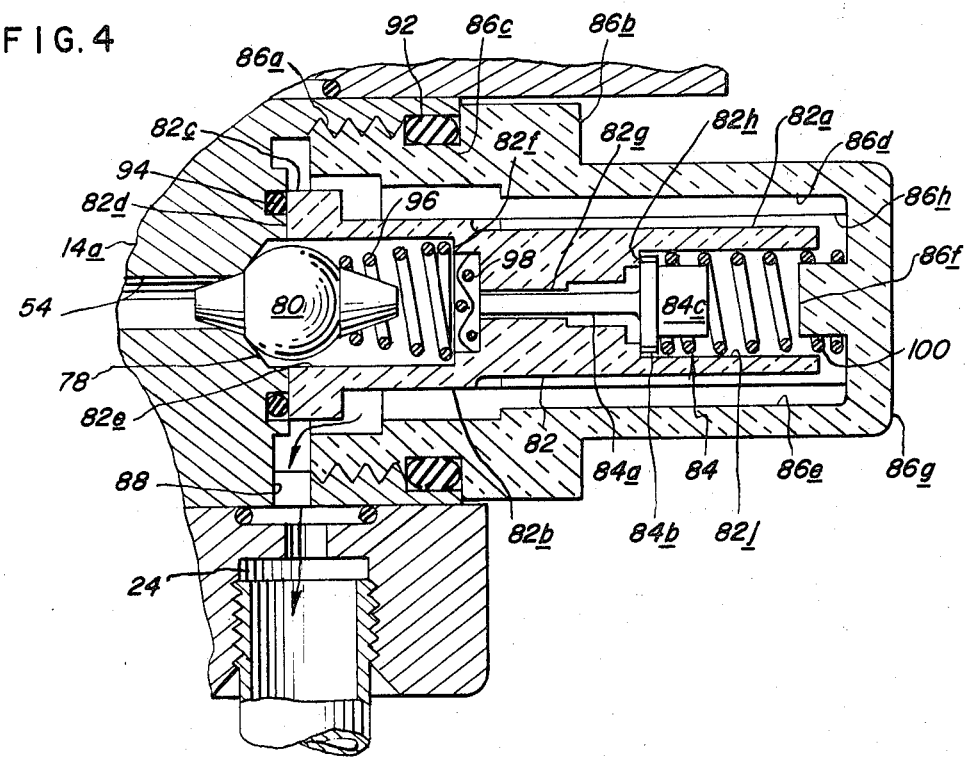
FIG. 4 is a greatly enlarged, fragmentary, longitudinal sectional view showing the indicator assembly with the lubricator converted for oil flow through an external line.

Flow from the indicating piston chamber is directed through the grooves such as 86d and 86e to the outlet port 88. By rotating the body 14 180°, the port 88 can be placed in communication with either the external conduit 24 as seen in FIG. 4 or the nozzle 26 seen in FIG. 1.

The nozzle is removable from the boss-like formation and is provided with an aerosol-tip configuration for injecting a hetero-sperse spray into the air line. A barb-like projection 26a is provided on the tip so that a capillary tube can be connected to the tip and run in the air line to the tool.

Flow Rate Adjuster

The flow rate adjuster assembly 28 cooperates with the piston assembly 29 so as to reduce the stroke of the oil piston 64 by moving the oil piston 64 relative to the air piston 66. The adjuster screw 102 which has a splined end 102a, an externally-threaded intermediate section 102b, and an abutment stud 102c, threadably engages the threaded section 66a of the air piston. As the screw 102 is advanced, the end 102c engages the disc section 64a of the oil piston 64 and urges it against the biasing spring 76 thereby moving the oil piston 64 away from the threaded section 66a which effectively increases the quantity of oil delivered by increasing piston end 64c travel past supply hole 56.

The adjuster assembly 28 also includes a plug-like section 104 having external threads 104a at one end for cooperation with internal threads 106 in the middle section 14a. The plug is axially positioned on the body 14a by means of an external shoulder 104b that abuts the end face of the body section and an O-ring 108 disposed in an intermediate retaining groove 104c pneumatically seals the threaded section. The outer end of the plug has inner and outer detent grooves such as 104d and 104e.

The plug is internally bored for cooperation with the piston 66 and splined screw 102. The piston end includes an enlarged section 104f in which an O-ring retaining washer 110 is seated, a reduced section 104g in which the pneumatic sealing O-ring 70 is seated, a guide section 104h for sliding cooperation with the air piston stem, and an abutment shoulder 104j which cooperates with the piston stem to limit movement of the piston toward the adjuster end.

The outer end of the bore includes a shoulder 104k and a retaining section 104L within which an annular lock ring 112 is positioned. The ring 112 has an enlarged bore and a short, internally-splined section 112a which lockingly cooperates with the collar 114. The collar 114 includes external splines 114a which engage the spline 112a and internal splines 114b which engage the splines 102a of screw 102, to prevent rotation of the screw relative to the ring 112 but permit axial movement of the screw 102. A compressible spring 115 which seats against shoulder 104k holds the collar 114 against the spline 112a.

The adjuster cap 116 includes an internal boss 116a which is axially splined for cooperation with the screw splines 102a and has an end face 116b for abutment with the collar 114. The cap also includes a plurality of detent-grasping fingers such as 116c and 116d, the ends of which cooperate with detents 104d and 104e.

In order to adjust the quantity of oil metered to the tool, the cap is slipped onto the spline 102a and pushed onto the plug until the fingers engage the inner detents 104d. In this position the boss end face 116b has engaged the lock collar 114 and disengaged the outer spline 114a and collar spline 112a. The screw can now be freely rotated so as to adjust the position of the oil piston. By retracting the cap to the position whereat the fingers engage the outer detent 104e the collar 114 reengages the ring 112 thereby preventing rotation of the screw. In order to render the adjuster substantially tamper-proof the cap can be completely withdrawn from screw and adjuster.

Operation

In operation, air flowing into the inlet port 18 flows against the piston 32a so as to urge it against the biasing spring 48. If the force acting on the piston is sufficient to move it upwardly, air flows from beneath the piston into the cavity 19 and from there out the exit port 20. As the piston 32a moves upwardly the stem 32c moves upwardly and the sealing O-ring 32f opens the port 36a so that there is an annular space defined between the passageway 36 and the reduced intermediate section 32d, and at the same time, the lower end 32e sealingly engages the seal 38. Some of the incoming air flows to the port 60 and exerts a force on the piston 66 so as to move the piston axially within the chamber 52 toward oil passageways.

As the air piston 66 moves, it urges the oil piston 64 toward the check valve 80 so that the shank portion 64c moves axially within the passageway 54 past the oil supply passageway 56 and forces a "slug" of oil against the check valve 80. The check valve 80 unseats and moves toward the filter 98 so that the oil passes around the check valve and through the filter 120. The oil entering the passageway 82g unseats the indicator piston 84 and moves it against the biasing spring 100 toward the post 86f. Oil flows around the indicator piston, into the groove-like passageway 86d and 86e and into the passageway 88. From the passageway 88 the oil flows to the nozzle 26 (as in FIG. 1) or the conduit 24 (as in FIG. 4). The nozzle injects the slug of oil into the air flowing from the chamber 19 in a manner so as to form a heterosperse mist in which the oil droplets have a size between 1.0 and 5.0 microns. Rather than injecting oil into the flowing air, a capillary tube may be fitted to the end of the nozzle 24 and to the pneumatic tool to carry the oil directly to the tool by a line internal of the air line.

When the air pressure entering the inlet port 20 drops below the activation level, the air piston 32a moves into sealing engagement with the upper body 18a, under the force of the biasing spring 48 until the O-ring 32f seats against the seat 36a. When this occurs the force on the air piston is reduced and the biasing spring 76 urges the oil piston 64 against the air piston 66 until the air piston bottoms on the shoulder 104h. This forces the remaining air back through the passageway 60 and out through the plug 40.

The indicator piston 84 moves with each pulse or slug of oil that is being injected into the system and thus if the unit if operating properly, the operator can view the axial movement of the piston. If the piston is not moving, it would be an indication to him that the air flow into the sensor assembly is improper or that the lubricator is not working properly. Furthermore, visual observation can be made of the condition of the filter 98 so as to determine whether or not the cap 86 should be removed for cleaning.

It will be appreciated that numerous modifications and changes can be made to the embodiment shown herein without departing from the spirit and scope of this invention.

What is claimed and desired to be secured by Letters Patent of the United States is:

1. A lubricator adapted to be positioned in a conduit for dispensing metered amounts of lubricant to a pneumatically-operated tool in response to changes in the air flow rate through the conduit to the tool, which includes means defining a lubricant system and means operatively associated therewith defining a pneumatic sensing and actuating system for sensing changes in the air flow rate and actuating said lubricant system to deliver lubricant, wherein the improvement in said lubricator comprises providing in association with said lubircant system, transparent means which define a portion of a lubricant flow path through said lubricant system and indicator piston means positioned in said transparent means, which piston means is movable between a first seated closed position and a second unseated flow position in response to lubricant flow, said movement being visually detectable from without said lubricator through said transparent means, wherein said transparent means include an elongated, transparent, sleeve-like member having a shaped bore and an elongated, cup-shaped transparent cover member having at least one elongated groove therein, said cover member adapted to receive said sleeve-like member in telescoping relation so as to permit lubricant flow in said groove, with said piston-like means being disposed in said bore for movement from said first seated position to said second unseated position.

2. In an injection lubricator of the type that provides gas flow as an energizing medium, a supply of lubricant, a lubricant delivery passageway means, and a first piston-type means arranged to be operated by the energizing medium to pressurize a selected amount of lubricant from the supply and to move said selected amount of lubricant through the lubricant delivery passageway means, the improvement of a flow indicator for determining the functioning of the lubricator, said indicator comprising, in combination: the lubricant delivery passageway means including therein an elongated, transparent, sleeve-like member downstream of the piston-type means and defining longitudinally therethrough a passageway for movement of lubricant therethrough, an indicator piston separate from the first piston-type means positioned in said passageway defined by the sleeve-like member, spring means normally biasing the indicator piston to one position within the sleeve-like member, and the flow of lubricant through the sleeve-like member operating against the bias of the spring means to move the indicator to a second position within the sleeve-like member.

3. A lubricator as in claim 2 including a cup-shaped transparent cover member surrounding said sleeve-like member and having at least one longitudinal groove in the inner wall thereof serving as part of the lubricant deliver passageway means downstream of the longitudinal passageway through the sleeve-like member.

4. A lubricator as in claim 3 wherein said cover member includes an end wall having biasing retaining means thereon projecting inwardly into the member for cooperation with said spring means.

5. A lubricator as in claim 2 wherein there is further provided check valve means disposed in said passageway means between said first piston-type means and said indicator piston.

6. A lubricator as in claim 2 including manual adjustment means for selectively varying the stroke of the piston-type means.

7. In an injection lubricator of the type that provides gas flow as an energizing medium, a supply of lubricant, and a pair of alternate passageway means through which lubricant is to be delivered, the improvement comprising, in combination: a pair of spaced casing members each defining therein an entry portion to one of the alternate passageway means, the entry portions extending oppositely to each other, a lubricant pumping module shaped and arranged to be located between and to cooperate with the pair of spaced casing members to receive lubricant and air separately from at least one of the casing members and to discharge pressurized lubricant therefrom to the entry portion of a selected one of the pair of alternate passageway means, one of said casing members being shaped and arranged to receive and direct a portion of the gas flow in a direction toward the space in which the lubricant pumping module is located, and the module having a pair of oppositely disposed gas inlet means and a pair of oppositely disposed lubricant inlet passageway means but only one lubricant discharge passageway means adapted to feed a selected one of the entry portions in the spaced casing members, so that displacement of the module 180° is operative to direct lubricant selectively to one or the other of the two alternate passageway means.

8. A lubricator as in claim 7 wherein the module includes therein piston-type means arranged to be energized by gas flow for pressurizing a selected amount of lubricant and check valve means between the piston-type means and the lubricant discharge passageway means.

9. A lubricator as in claim 8 including manual adjustment means for selectively varying the stroke of the piston-type means.

10. A lubricator as in claim 8 including an indicator means in the lubricant discharge passageway means for indicating the operation of the module.

11. In an injection lubricator of the type that provides gas flow as an energizing medium, a supply of lubricant, a lubricant delivery passage-way means, and piston-type means arranged to be operated by the energizing medium to pressurize a selected amount of lubricant from the supply and to move said selected amount of lubricant through the lubricant delivery passageway means, the improvement of a substantially leak-free, low-air consumption sensing and valving system which includes:

casing means which define: (1) spaced gas inlet means and gas outlet means; (2) a sleeve-type annular opening between said gas inlet and gas outlet; (3) an elongated valve-receiving bore opposite and in alignment with said sleeve, one end of which is adapted to communicate with said gas inlet means and the other end of which opens to atmosphere; and (4) a branch flow path for providing communication between said valve-receiving bore and said first piston-type means;

biased sensing means movable within said sleeve from a first position toward a second position in response to increases in the gas flow rate between said inlet and said outlet, and;

valve means cooperatively associated with said sensing means and said valve-receiving bore (1) for permitting flow through said one end and into said branch when said sensor moves toward said second position while preventing flow between said inlet and said other end of said bore, and (2) for preventing flow into said one end when said sensing means is in said first position but permitting communication between said branch and said other end of said bore.

12. In an injection lubricator of the type that provides gas flow as an energizing medium, a supply of lubricant, a lubricant delivery passageway means, piston-type means arranged to be operated by the energizing medium to pressurize a selected amount of lubricant from the supply and to move said selected amount of lubricant through the lubricant delivery passageway means, a pair of abutting casing members, one of which houses the piston-type means, the other casing member defining spaced gas inlet and outlet means, flow passageway means between the inlet and outlet means, the flow passageway means providing a gas flow branch in which a spring-biased piston-like sensor is positioned and a secondary branch through which gas under pressure is supplied to the piston-type means to operate same, the improvement comprising, in combination: an elongated bore in the first casing one end of which provides an outlet for gas as it is being vented from the piston-type means in the one casing member, the other end of the bore having a valve seat defined thereat, an elongated valve stem slidable in said elongated bore and being coupled to the piston-like sensor to move therewith, first valving means on said stem adapted for engagement with said valve seat, a second valving means positioned in said bore spaced longitudinally from said valve seat and arranged to provide a seal when the first valving means is unseated but to permit venting flow when the first valving means is seated, and said secondary branch including gas flow passageway means that intersect the elongated bore at a point longitudinally between the valve seat and the second valving means.

* * * * *